US009922478B1

(12) United States Patent
Wong

(10) Patent No.: US 9,922,478 B1
(45) Date of Patent: Mar. 20, 2018

(54) PRESSING DEVICE FOR GARAGE DOOR CONTROLLER

(71) Applicant: Nortek Security & Control LLC, Carlsbad, CA (US)

(72) Inventor: Robert King Wong, San Marcos, CA (US)

(73) Assignee: Nortek Security & Control LLC, Carlsbad, CA (US)

( * ) Notice: Subject to any disclaimer, the term of this patent is extended or adjusted under 35 U.S.C. 154(b) by 0 days.

(21) Appl. No.: 15/393,172

(22) Filed: Dec. 28, 2016

(51) Int. Cl.

| | |
|---|---|
| ***G05B 19/00*** | (2006.01) |
| ***G05B 23/00*** | (2006.01) |
| ***G06F 7/04*** | (2006.01) |
| ***G06F 7/00*** | (2006.01) |
| ***G06K 19/00*** | (2006.01) |
| ***G08B 5/00*** | (2006.01) |
| ***G08B 13/00*** | (2006.01) |
| ***G08B 19/00*** | (2006.01) |
| ***G08B 21/00*** | (2006.01) |
| ***G08B 23/00*** | (2006.01) |
| ***G08B 25/00*** | (2006.01) |
| ***G08B 29/00*** | (2006.01) |
| ***G08C 19/00*** | (2006.01) |
| ***H04B 1/00*** | (2006.01) |
| ***H04B 3/00*** | (2006.01) |
| ***H04L 9/14*** | (2006.01) |
| ***H04L 9/32*** | (2006.01) |

(Continued)

(52) U.S. Cl.
CPC .......... *G07C 9/00174* (2013.01); *E05F 15/60* (2015.01); *G08B 21/18* (2013.01); *G07C 2009/00928* (2013.01)

(58) Field of Classification Search
CPC ...... G07C 9/00174; G07C 2009/00928; G08B 21/18; E05F 15/60
See application file for complete search history.

(56) References Cited

U.S. PATENT DOCUMENTS

2015/0097689 A1* 4/2015 Logue .................... G08B 25/10 340/632
2015/0262443 A1* 9/2015 Chong ............... G07C 9/00896 340/5.71

(Continued)

OTHER PUBLICATIONS

Automated Pneumatic Button Pusher, see http://www.instructables.com/id/Automated-Pneumatic-Button-Pusher/, last visited Jul. 5, 2017, http://web.archive.org/web/20150423042857/http://www.instructables.com/id/Automated-Pneumatic-Button-Pusher/, published by Apr. 23, 2015.*

*Primary Examiner* — Erin File
(74) *Attorney, Agent, or Firm* — Schwegman Lundberg & Woessner, P.A.

(57) ABSTRACT

A pressing device includes a pressing device switch configured to cover a garage door switch. The garage door switch operates a garage door opener connected to the garage door switch. An actuator is coupled to the pressing device switch. An indicator outputs a combination of an audio and video signal. The pressing device receives a garage door control command and generates a warning signal to the indicator. The indicator outputs the combination of the audio and video signal in response to receiving the warning signal, and generates a trigger signal to the actuator. The actuator physically presses on the garage door switch in response to receiving the trigger signal.

14 Claims, 5 Drawing Sheets

(51) Int. Cl.
*G07C 9/00* (2006.01)
*E05F 15/60* (2015.01)
*G08B 21/18* (2006.01)

(56) References Cited

U.S. PATENT DOCUMENTS

| | | | | |
|---|---|---|---|---|
| 2015/0372832 | A1* | 12/2015 | Kortz | G05B 15/02 700/278 |
| 2016/0316363 | A1* | 10/2016 | Li | H04W 12/04 |
| 2017/0023963 | A1* | 1/2017 | Davis | G05F 1/66 |

* cited by examiner

PRESSING DEVICE FOR GARAGE DOOR CONTROLLER

TECHNICAL FIELD

This application relates generally to a device for pressing a garage door wall controller, and, in a specific example embodiment, a device for generating an audio and visual signal and remotely activating a garage door.

BACKGROUND

Garage door openers typically include a wall-mounted switch to trigger opening or closing of a garage door. However, some wall-mounted switches utilize a proprietary communication protocol to only communicate with compatible devices. Therefore, a wall-mounted switch from a specific manufacturer may not be able to operate with home control devices from other manufacturers.

BRIEF DESCRIPTION OF THE DRAWINGS

The present embodiments are illustrated by way of example, and not by way of limitation, in the figures of the accompanying drawings.

DETAILED DESCRIPTION

Figure 1:
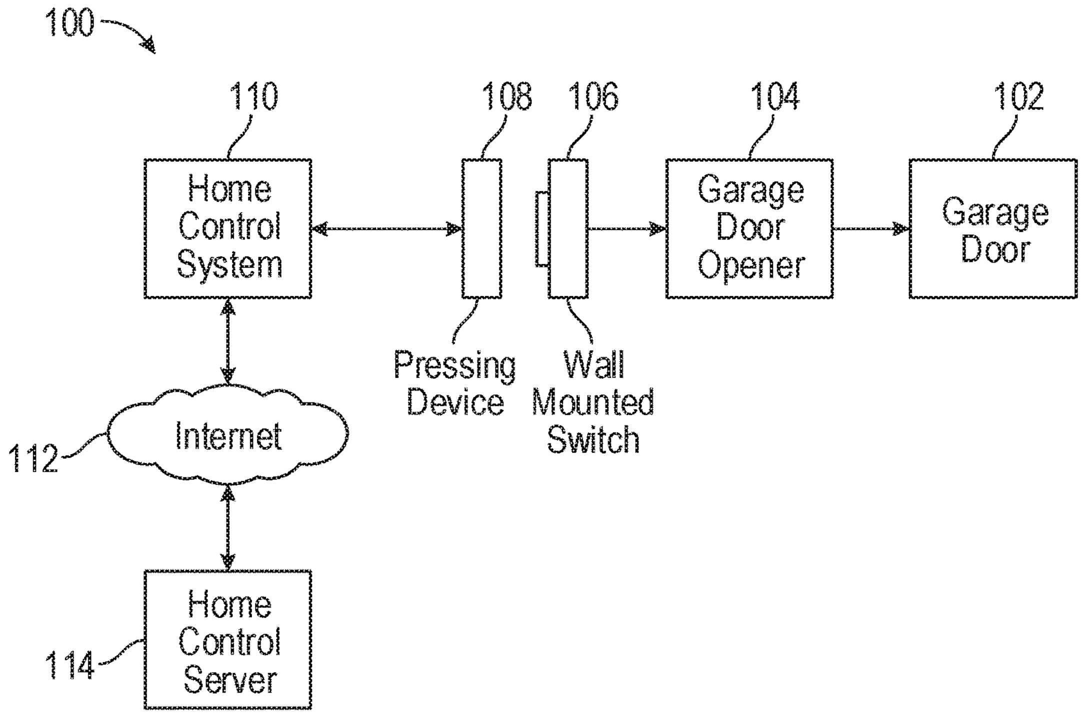
FIG. 1 is a diagram illustrating an architecture of a garage door wall controller pressing device in operation with a garage door system.

Although the present disclosure has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

The present disclosure describes an electro-mechanical device (also referred to as a pressing device) that provides a UL 985-compliant audio and visual warning prior to articulating an arm or a plunger for an adjustable throw and duration to activate a garage door wall-mounted switch. In one example embodiment, the pressing device includes an audio device (e.g., piezo sounder), a visual device (e.g., LED light), an actuator (e.g., a mechanical arm or a plunger), and an activation button.

The pressing device may be configured to operate in conjunction with a standard garage door motor and the corresponding wall-mounted push button. Upon receipt of a request by a user (e.g., pressing the activation button), the pressing device activates the piezo sounder and the LED to provide the UL 985 five-second (minimum) warning prior to any other action.

Once the warnings are completed, the pressing device articulates down to depress the garage door wall-mounted button for one second, then returns to the rest position. Both the depth and duration of the articulation can be adjustable.

The pressing device can be used in other situations where an audio and visual warning is desired prior to activation of a mechanical device or action. For example, the pressing device can be used to generate a warning prior to pressing another button to lock or unlock a door or dispense a material.

One benefit of the presently described pressing device is the ability to be universally applied to any brand or type of garage door switch. Current solutions are limited in that they are not fully compatible with all garage door openers. Many garage door systems utilize a proprietary interface to operate the respective garage door. The presently described pressing device offers an adjustable mechanical actuator with adjustable movement and duration that enables the pressing device to be compatible with all garage door openers that utilize a push button trigger.

In various embodiments, a pressing device includes a pressing device switch configured to cover a garage door switch. The garage door switch operates a garage door opener connected to the garage door switch. An actuator is coupled to the pressing device switch. An indicator outputs a combination of an audio and video signal. The pressing device receives a garage door control command and generates a warning signal to the indicator. The indicator outputs the combination of audio and video signal in response to receiving the warning signal, and generates a trigger signal to the actuator. The actuator physically presses on the garage door switch in response to receiving the trigger signal.

In one example embodiment, the trigger signal is generated after a preset time has elapsed after generating the warning signal.

In one example embodiment, the pressing device includes a lever coupled to the actuator with the pressing device switch. The lever is supported by a fulcrum. A first end of the lever is adjacent to the actuator, and a second end is adjacent to the pressing device switch. The first end is opposite to the second end.

In one example embodiment, the first end of the lever is configured to press on the garage door switch in response to the actuator pushing against the second end of the lever.

In another example embodiment, the first end of the lever is configured to press on the garage door switch in response to the pressing device switch being pushed against the first end of the lever.

In another example embodiment, the actuator is disposed between the pressing device switch and the garage door switch.

In another example embodiment, the pressing device detects an operation on the pressing device switch, and generates the trigger signal to the actuator in response to detecting the operation on the pressing device switch.

In another example embodiment, the pressing device further comprises a transceiver configured to communicate with a home control system. The home control system is not configured to communicate directly with the garage door opener. The pressing device transparently interfaces from the home control system with the garage door opener.

In another example embodiment, the pressing device receives a movement input and duration input, adjusts a distance of a movement of an arm of the actuator, the distance corresponding to the movement input, and adjusts a duration of a pressing of the arm of the actuator. The duration corresponds to the duration input.

In another example embodiment, the pressing device detects a model of the garage door switch, accesses a configuration setting corresponding to the model of the garage door switch, and adjusts a distance of a movement of an arm of the actuator and a duration of a pressing of the arm of the actuator based on the configuration setting.

FIG. 1 is a diagram illustrating an architecture 100 of a garage door wall controller pressing device in operation with a garage door system. A garage door opener 104 operates a garage door 102 to open or close the garage door 102 via mechanical means (e.g., belt or chain drive). The garage door opener 104 is connected to a wall-mounted switch 106. A user presses on the wall-mounted switch 106 to direct the garage door opener 104 to close or open the garage door 102.

A pressing device 108 is mounted on the wall-mounted switch 106 and mechanically presses and depresses the wall-mounted switch 106. The pressing device 108 communicates with a home control system 110. The home control system 110 can remotely control the pressing device 108 to activate the wall-mounted switch 106. For example, the home control system 110 transmits a wireless control signal to the pressing device 108. In one example embodiment, the home control system 110 includes a computing system capable of communicating with a computer network (e.g., Internet 112) to a home control server 114. The home control server 114 can be configured to remotely control the home control system 110.

Figure 2:
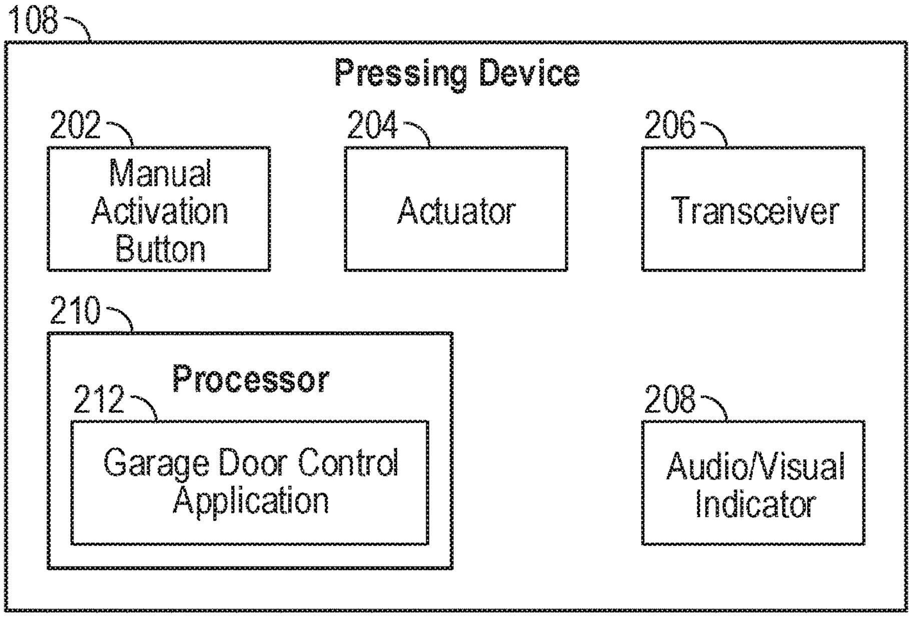
FIG. 2 is a block diagram illustrating an example embodiment of a pressing device.

FIG. 2 is a block diagram illustrating an example embodiment of a pressing device. The pressing device 108 includes a manual activation button 202, an actuator 204, a transceiver 206, an audio/visual indicator 208, and a processor 210. The manual activation button 202 includes, for example, a physical switch that a user can press on to activate the garage door opener 104.

The actuator 204 includes a mechanical arm or plunging element that pushes against the wall-mounted switch 106. The actuator 204 can operate in response to a combination of receiving a control signal from the home control system 110 or a pressing of the manual activation button 202. For example, pressing the manual activation button 202 causes a control signal to trigger the actuator 204. In another example, the home control system 110 wireless sends a control signal to the actuator 204 to remotely trigger the actuator 204.

The transceiver 206 communicates with the home control system 110. The transceiver 206 includes a wired or wireless communication means (e.g., WiFi, Bluetooth, Zigbee). For example, the transceiver 206 receives the control signal and configuration settings from the home control system 110. In another example, the transceiver 206 sends a status signal to the home control system 110 to provide a status of the actuator 204.

The audio/visual indicator 208 includes an audio generating device such as a buzzer or a speaker and a visual signal generating device such as an LED. The audio/visual indicator 208 can be used to alert the user of the pressing device 108 that a control signal to open or close the garage door 102 has been received at the pressing device 108. In another example embodiment, the audio/visual indicator 208 generates an audio/visual signal upon detecting that the manual activation button 202 has been depressed. The audio/visual signal provides notification to the user that the garage door opener 104 has been triggered and that the garage door 102 is about to open or close within a preset duration (e.g., 10 seconds) after the audio/visual signal is generated.

The processor 210 includes a garage door control application 212 configured to detect that the manual activation button 202 has been depressed or that a garage door control command (from the home control system 110 or from another device registered with the pressing device 108) has been received. The garage door control application 212 generates a control signal to the actuator 204 in response to detecting that the manual activation button 202 has been depressed or that the garage door control command has been received. In one example embodiment, the garage door control application 212 sends a notification control signal to the audio/visual indicator 208 to generate an audio/visual signal to alert the user of the imminent opening or closure of the garage door 102. In one example embodiment, the garage door control application 212 delays sending the control signal to the actuator 204 for a preset time duration (e.g., 10 seconds) after sending the notification control signal to the audio/visual indicator 208.

Figure 3A:
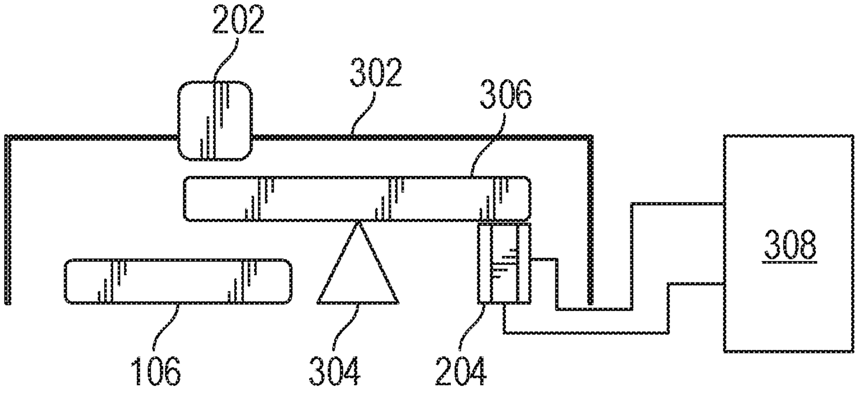
FIG. 3A is a block diagram illustrating an example embodiment of the pressing device.

FIG. 3A is a block diagram illustrating an example embodiment of the pressing device 108. The pressing device 108 includes a cover 302 that is configured to be mounted on the wall-mounted switch 106 (e.g., existing garage door button). The manual activation button 202 protrudes from the cover 302. The manual activation button 202 sits on a first end of a lever 306 supported by a fulcrum 304. A second end of the lever 306 sits on the actuator 204 that is connected to a controller 308. In one example embodiment, the controller 308 includes the transceiver 206, the processor 210, and the audio/visual indicator 208.

Figure 3B:
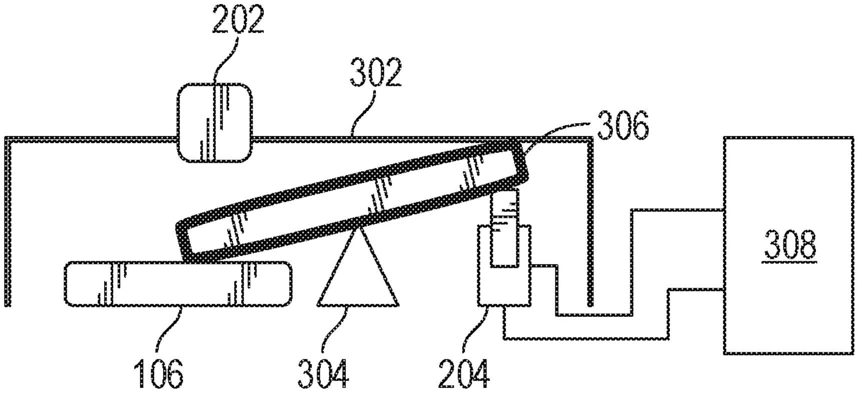
FIG. 3B is a block diagram illustrating an example embodiment of a remote activation of the pressing device.

FIG. 3B is a block diagram illustrating an example embodiment of a remote activation of the pressing device 108. The garage door control application 212 sends a control signal to trigger the actuator 204. The actuator 204 mechanically pushes against the second end of the lever 306 and causes the first end of the lever 306 to push against the wall-mounted switch 106.

Figure 3C:
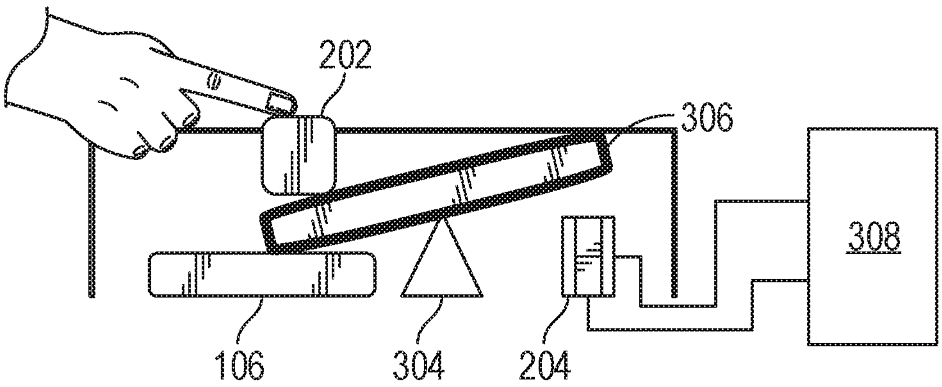
FIG. 3C is a block diagram illustrating an example embodiment of a manual activation of the pressing device.

FIG. 3C is a block diagram illustrating an example embodiment of a manual activation of the pressing device 108. A user manually pushes against the manual activation button 202, causing the manual activation button 202 to push the first end of the lever 306 to press against the wall-mounted switch 106.

Figure 4A:
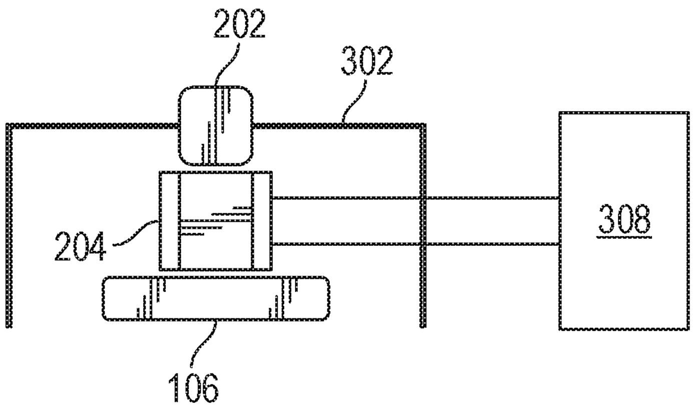
FIG. 4A is a block diagram illustrating another example embodiment of the pressing device.

FIG. 4A is a block diagram illustrating another example embodiment of the pressing device 108. The pressing device 108 includes the cover 302 that is configured to be mounted on the wall-mounted switch 106 (e.g., existing garage door button). The manual activation button 202 protrudes from the cover 302. The manual activation button 202 sits on top of the actuator 204 or a trigger sensor (not shown) for the actuator 204.

Figure 4B:
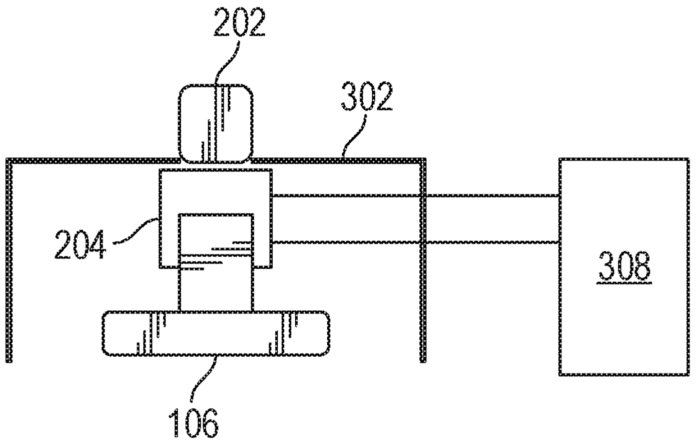
FIG. 4B is a block diagram illustrating another example embodiment of a remote activation of the pressing device.

FIG. 4B is a block diagram illustrating another example embodiment of a remote activation of the pressing device 108. The garage door control application 212 sends a control signal to trigger the actuator 204. The actuator 204 mechanically pushes against the wall-mounted switch 106.

Figure 4C:
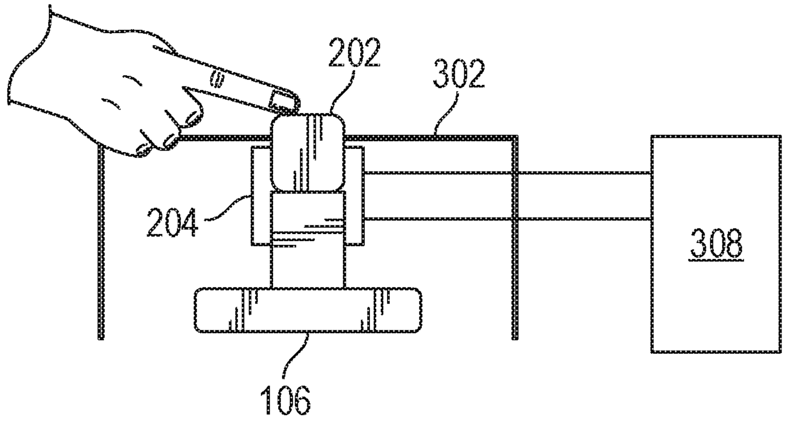
FIG. 4C is a block diagram illustrating another example embodiment of a manual activation of the pressing device.

FIG. 4C is a block diagram illustrating another example embodiment of a manual activation of the pressing device

108. A user manually pushes against the manual activation button 202, causing the manual activation button 202 to push against the actuator 204 or against the trigger sensor of the actuator 204. The actuator 204 is either manually pushed against the wall-mounted switch 106 or electrically triggered by the trigger sensor to be pushed against the wall-mounted switch 106.

Figure 5:
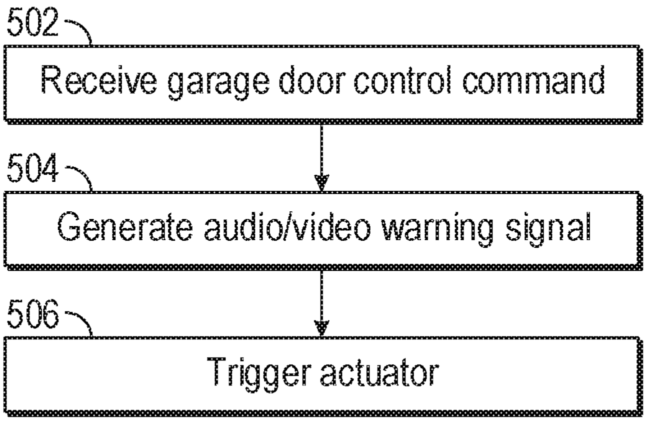
FIG. 5 is a flow diagram illustrating an example embodiment of a method for remotely operating the pressing device.

FIG. 5 is a flow diagram illustrating an example embodiment of a method for remotely operating the pressing device 108. At operation 502, the pressing device 108 receives a garage control command from the home control system 110. At operation 504, the pressing device 108 generates an audio/visual warning signal after receiving the garage control command. At operation 506, the pressing device 108 triggers the actuator 204 to push the wall-mounted switch 106 after a preset time duration has elapsed from the time the audio/visual warning signal is generated.

Figure 6:
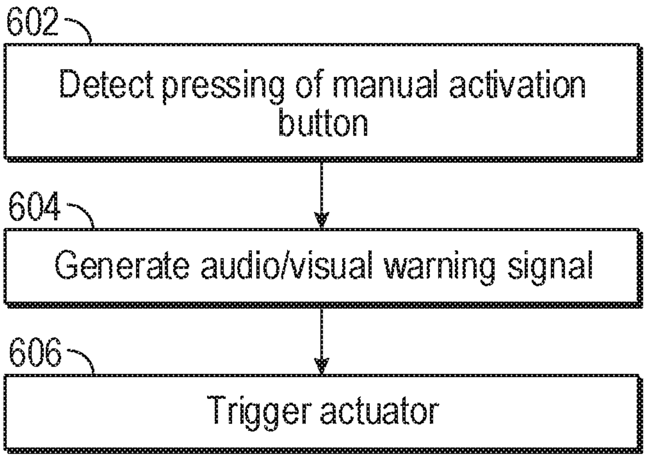
FIG. 6 is a flow diagram illustrating an example embodiment of a method for manually operating the pressing device.

FIG. 6 is a flow diagram illustrating an example embodiment of a method for manually operating the pressing device 108. At operation 602, the pressing device 108 detects that the manual activation button 202 has been pressed. At operation 604, the pressing device 108 generates an audio/visual warning signal after detecting that the manual activation button 202 has been pressed. At operation 606, the pressing device 108 triggers the actuator 204 to push the wall-mounted switch 106 after a time duration has elapsed from the time the audio/visual warning signal is generated.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a communication network such as the Internet 112 and via one or more appropriate interfaces (e.g., application programming interfaces (APIs)).

Electronic Apparatus and System

Example embodiments may be implemented in digital electronic circuitry, in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network such as the Internet 112.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network such as the Internet 112. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture

Figure 7:
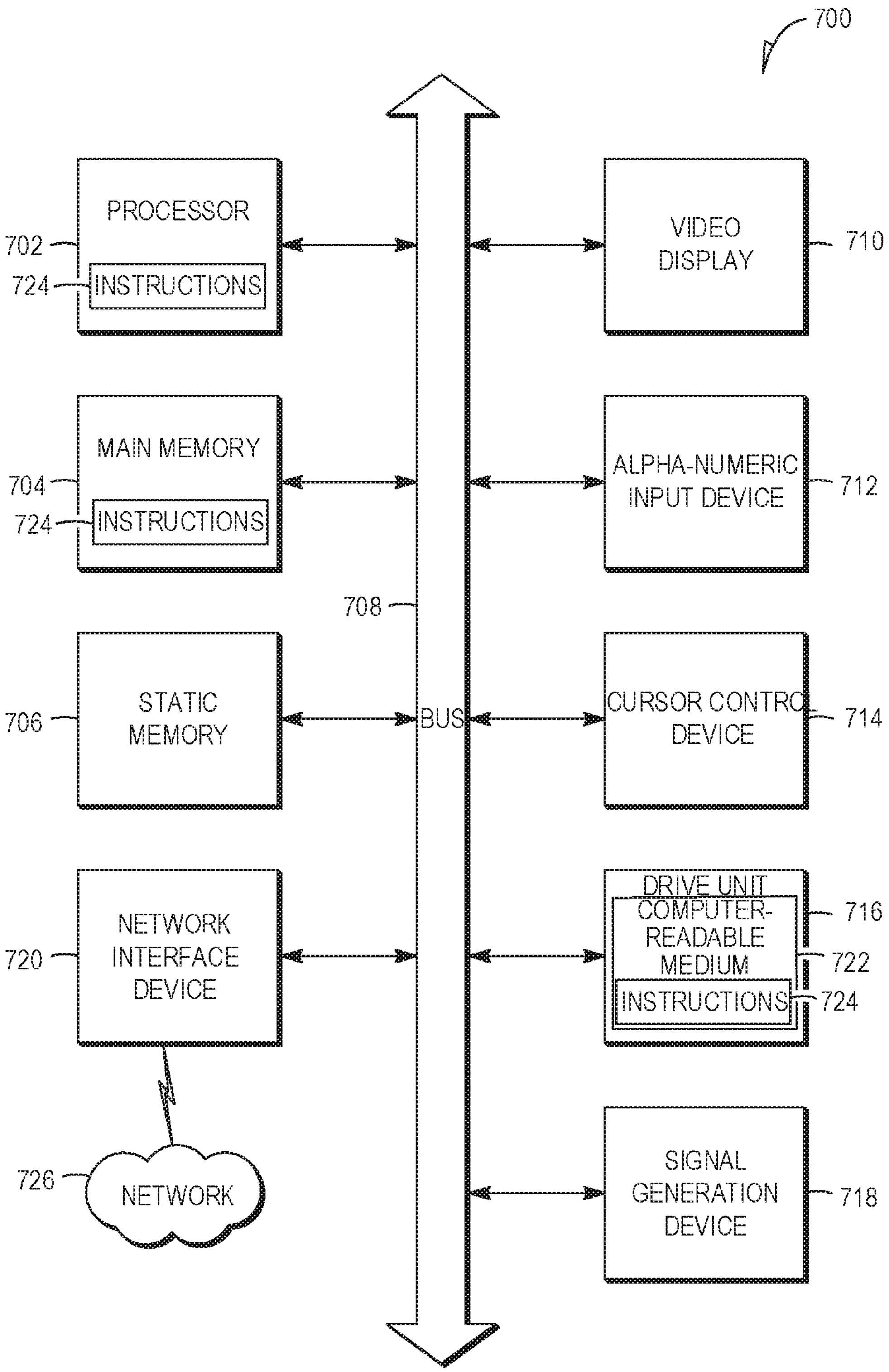
FIG. 7 shows a diagrammatic representation of a machine in the example form of a computer system within which a set of instructions may be executed to cause the machine to perform any one or more of the methodologies discussed herein.

FIG. 7 is a block diagram of a machine in the example form of a computer system 700 within which instructions 724 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, a network switch, a network bridge, or any machine capable of executing the instructions 724 (sequential or otherwise) that specify actions to be taken by that machine. Further, while only a single machine is illustrated, the term "machine" shall also be taken to include any collection of machines that individually or jointly execute a set (or multiple sets) of instructions 724 to perform any one or more of the methodologies discussed herein.

The example computer system 700 includes a processor 702 (e.g., a central processing unit (CPU), a graphics processing unit (GPU), or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation (or cursor control) device 714 (e.g., a mouse), a disk drive unit 716, a signal generation device 718 (e.g., a speaker), and a network interface device 720.

Machine-Readable Medium

The disk drive unit 716 includes a computer-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting computer-readable media 722. The instructions 724 may also reside, completely or at least partially, within the static memory 706.

While the computer-readable medium 722 is shown, in an example embodiment, to be a single medium, the term "machine-readable medium" may include a single medium or multiple media (e.g., a centralized or distributed database, and/or associated caches and servers) that store the one or more instructions 724 or data structures. The term "computer-readable medium" shall also be taken to include any tangible medium that is capable of storing, encoding, or carrying the instructions 724 for execution by the machine and that cause the machine to perform any one or more of the methodologies of the present embodiments, or that is capable of storing, encoding, or carrying data structures utilized by or associated with such instructions 724. The term "computer-readable medium" shall accordingly be taken to include, but not be limited to, solid-state memories, and optical and magnetic media. Specific examples of computer-readable media 722 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 724 may further be transmitted or received over a communication network 726 (e.g., the Internet 112) using a transmission medium. The instructions 724 may be transmitted using the network interface device 720 and any one of a number of well-known transfer protocols (e.g., hypertext transfer protocol (HTTP)). Examples of communication networks 726 include a local-area network (LAN), a wide-area network (WAN), the Internet, mobile telephone networks, plain old telephone service (POTS) networks, and wireless data networks (e.g., Wi-Fi and WiMAX networks). The term "transmission medium" shall be taken to include any intangible medium capable of storing, encoding, or carrying the instructions 724 for execution by the machine, and includes digital or analog communications signals or other intangible media to facilitate communication of such software.

Although an embodiment has been described with reference to specific example embodiments, it will be evident that various modifications and changes may be made to these embodiments without departing from the scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced.

The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

The following enumerated embodiments describe various example embodiments of a pressing device discussed herein.

A first embodiment provides a pressing device comprising:

a pressing device switch configured to cover a garage door switch, the garage door switch configured to operate a garage door opener connected to the garage door switch;

an actuator coupled to the pressing device switch;

an indicator configured to output a combination of an audio and video signal;

a processor configured to perform operations comprising:

receiving a garage door control command;

generating a warning signal to the indicator, the indicator configured to output the combination of the audio and video signal in response to receiving the warning signal; and generating a trigger signal to the actuator, the actuator configured to physically press on the garage door switch in response to receiving the trigger signal.

A second embodiment provides a device according to the first embodiment, wherein the trigger signal is generated after a preset time has elapsed after the generating of the warning signal.

A third embodiment provides a device according to the first embodiment, further comprising:

a lever coupled to the actuator with the pressing device switch, wherein the lever is supported by a fulcrum, a first end of the lever adjacent to the actuator, a second end adjacent to the pressing device switch, the first end being opposite to the second end.

A fourth embodiment provides a device according to the first embodiment, wherein the first end of the lever is configured to press on the garage door switch in response to the actuator pushing against the second end of the lever.

A fifth embodiment provides a device according to the third embodiment, wherein the first end of the lever is configured to press on the garage door switch in response to the pressing device switch being pushed against the first end of the lever.

A sixth embodiment provides a device according to the first embodiment, wherein the actuator is disposed between the pressing device switch and the garage door switch.

A seventh embodiment provides a device according to the sixth embodiment, wherein the operations further comprise:

detecting an operation on the pressing device switch; and generating the trigger signal to the actuator in response to detecting the operation on the pressing device switch.

An eighth embodiment provides a device according to the first embodiment, further comprising:

a transceiver configured to communicate with a home control system, wherein the home control system is not configured to communicate directly with the garage door opener, wherein the pressing device transparently interfaces from the home control system with the garage door opener.

A ninth embodiment provides a device according to the first embodiment, wherein the operations further comprise:

receiving a movement input and duration input;

adjusting a di stance of a movement of an arm of the actuator, the di stance corresponding to the movement input; and adjusting a duration of a pressing of the arm of the actuator, the duration corresponding to the duration input.

A tenth embodiment provides a device according to the first embodiment, wherein the operations further comprise:

detecting a model of the garage door switch;

accessing a configuration setting corresponding to the model of the garage door switch; and adjusting a distance of a movement of an arm of the actuator and a duration of a pressing of the arm of the actuator based on the configuration setting.

What is claimed is:

1. A pressing device comprising:

a pressing device switch configured to cover a garage door switch, the garage door switch configured to operate a garage door opener connected to the garage door switch;

an actuator coupled to the pressing device switch;

an indicator configured to output a combination of an audio and video signal;

a lever coupled to the actuator with the pressing device switch, the lever being supported by a fulcrum, a first end of the lever adjacent to the actuator, a second end adjacent to the pressing device switch, the first end being opposite to the second end;

a processor configured to perform operations comprising:

receiving a garage door control command;

generating a warning signal to the indicator, the indicator configured to output the combination of the audio and video signal in response to receiving the warning signal; and generating a trigger signal to the actuator, the actuator configured to physically press on the garage door switch in response to receiving the trigger signal.

2. The pressing device of claim 1, wherein the trigger signal is generated after a preset time has elapsed after the generating the warning signal.

3. The pressing device of claim 1, wherein the first end of the lever is configured to press on the garage door switch in response to the actuator pushing against the second end of the lever.

4. The pressing device of claim 1, wherein the first end of the lever is configured to press on the garage door switch in response to the pressing device switch being pushed against the first end of the lever.

5. The pressing device of claim 1, further comprising:

a transceiver configured to communicate with a home control system, wherein the home control system is not configured to communicate directly with the garage door opener, wherein the pressing device transparently interfaces from the home control system with the garage door opener.

6. The pressing device of claim 1, wherein the operations further comprise:

receiving a movement input and duration input;

adjusting a distance of a movement of an arm of the actuator, the distance corresponding to the movement input; and adjusting a duration of a pressing of the arm of the actuator, the duration corresponding to the duration input.

7. The pressing device of claim 1, wherein the operations further comprise:

detecting a model of the garage door switch;

accessing a configuration setting corresponding to the model of the garage door switch; and adjusting a distance of a movement of an arm of the actuator and a duration of a pressing of the arm of the actuator based on the configuration setting.

8. A method comprising:

receiving a garage door control command at a pressing device having a pressing device switch configured to cover a garage door switch, the garage door switch configured to operate a garage door opener connected to the garage door switch, the pressing device comprising a lever coupled to the actuator and the pressing device switch, the lever being supported by a fulcrum, a first end of the lever being adjacent to the actuator, a second end being adjacent to the pressing device switch, the first end being opposite to the second end;

generating a warning signal to an indicator on the pressing device in response to receiving the garage door control command, the indicator configured to output the combination of audio and video signal in response to receiving the warning signal; and generating a trigger signal to an actuator of the pressing device, the actuator configured to physically press on the garage door switch in response to receiving the trigger signal.

9. The method of claim 8, further comprising:

generating the trigger signal after a preset time has elapsed after generating the warning signal.

10. The method of claim 8, wherein the first end of the lever is configured to press on the garage door switch in response to the actuator pushing against the second end of the lever.

11. The method of claim 8, wherein the first end of the lever is configured to press on the garage door switch in response to the pressing device switch being pushed against the first end of the lever.

12. The method of claim 8, further comprising:

communicating with a home control system using a transceiver in the pressing device; and interfacing the home control system with the garage door opener using the pressing device, wherein the home control system is not configured to communicate directly with the garage door opener.

13. The method of claim 8, further comprising:

receiving a configuration setting including a movement input and a duration input;

adjusting a distance of a movement of an arm of the actuator, the distance corresponding to the movement input; and adjusting a duration of a duration of a pressing of the arm of the actuator, the duration corresponding to the duration input.

14. A non-transitory computer-readable storage medium storing a set of instructions that, when executed by a processor, cause the processor to perform operations comprising:

receiving a garage door control command at a pressing device having a pressing device switch configured to cover a garage door switch, the garage door switch configured to operate a garage door opener connected to the garage door switch, the pressing device comprising a lever coupled to the actuator and the pressing device switch, the lever being supported by a fulcrum, a first end of the lever being adjacent to the actuator, a second end being adjacent to the pressing device switch, the first end being opposite to the second end;

generating a warning signal to an indicator on the pressing device in response to receiving the garage door control command, the indicator configured to output the combination of audio and video signal in response to receiving the warning signal; and generating a trigger signal to an actuator of the pressing device, the actuator configured to physically press on the garage door switch in response to receiving the trigger signal.

* * * * *